(12) United States Patent
Chiba et al.

(10) Patent No.: US 9,386,483 B2
(45) Date of Patent: Jul. 5, 2016

(54) METHOD AND APPARATUS FOR PERFORMING HANDOVER AND RE-ESTABLISHMENT OF CONNECTIONS

(71) Applicant: NOKIA SOLUTIONS AND NETWORKS OY, Espoo (FI)

(72) Inventors: Tsunehiko Chiba, Saitama (JP); Srinivasan Selvaganapathy, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 184 days.

(21) Appl. No.: 14/175,747

(22) Filed: Feb. 7, 2014

(65) Prior Publication Data

US 2015/0230134 A1    Aug. 13, 2015

(51) Int. Cl.
| | |
|---|---|
| *H04W 4/00* | (2009.01) |
| *H04W 36/00* | (2009.01) |
| *H04W 36/32* | (2009.01) |
| *H04W 76/02* | (2009.01) |

(52) U.S. Cl.
CPC ...... *H04W 36/0016* (2013.01); *H04W 36/0072* (2013.01); *H04W 36/32* (2013.01); *H04W 76/025* (2013.01)

(58) Field of Classification Search
None
See application file for complete search history.

(56) References Cited

U.S. PATENT DOCUMENTS

| | | | |
|---|---|---|---|
| 2008/0267127 A1 | 10/2008 | Narasimha et al. | |
| 2008/0268850 A1 | 10/2008 | Narasimha et al. | |
| 2012/0093128 A1* | 4/2012 | Song | H04W 36/0077 370/331 |
| 2015/0029955 A1* | 1/2015 | Heo | H04W 76/02 370/329 |

FOREIGN PATENT DOCUMENTS

| | | |
|---|---|---|
| EP | 2 448 329 A1 | 5/2012 |
| WO | 2014/206489 A1 | 12/2014 |

OTHER PUBLICATIONS

U.S. Appl. No. 61/859,121, Specification, Heo et al. Jul. 26, 2013.*
3GPP TR 36.842 V12.0.0 (Dec. 2013); 3rd Generation Partnership Project; Technical Specification Group Radio Access Network; Study on Small Cell enhancements for E-UTRA and E-UTRAN; Higher layer aspects (Release 12).
3GPP TS 36.300 V12.0.0 (Dec. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.331 V12.0.0 (Dec. 2013); 3rd Generation Partnership Project; Technical Specification Group Radio Access Network; Evolved Universal Terrestrial Radio Access (E-UTRA); Radio Resource Control (RRC); Protocol specification (Release 12).

(Continued)

*Primary Examiner* — Afshawn Towfighi
(74) *Attorney, Agent, or Firm* — Squire Patton Boggs (US) LLP

(57) ABSTRACT

A method and apparatus can be configured to detect that a signaling strength of a first network entity has dropped below a threshold. The method can also include transmitting a measurement report to the first network entity. The method can also include receiving radio-resource-control reconfiguration information from the first network entity. The method can also include transmitting a scheduling request to a second network entity, wherein a random-access-channel procedure is avoided.

22 Claims, 10 Drawing Sheets

(56) References Cited

OTHER PUBLICATIONS

3GPP TS 36.423 V12.0.0 (Dec. 2013); 3rd Generation Partnership Project; Technical Specification Group Radio Access Network; Evolved Universal Terrestrial Radio Access Network (E-UTRAN); X2 application protocol (X2AP) (Release 12).

International Search Report application No. PCT/EP2015/052481 dated Apr. 16, 2015.

3GPP TR 36.842 V1.0.0 (Nov. 2013); 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), pp. 1-68.

* cited by examiner

METHOD AND APPARATUS FOR PERFORMING HANDOVER AND RE-ESTABLISHMENT OF CONNECTIONS

BACKGROUND

1. Field

Embodiments of the invention relate to performing handover and re-establishment of connections in dual-connectivity operation.

2. Description of the Related Art

Long-term Evolution (LTE) is a standard for wireless communication that seeks to provide improved speed and capacity for wireless communications by using new modulation/signal processing techniques. The standard was proposed by the 3 Generation Partnership Project (3GPP), and is based upon previous network technologies. Since its inception, LTE has seen extensive deployment in a wide variety of contexts involving the communication of data.

SUMMARY

According to a first embodiment, a method can include detecting, by a user equipment, that a signaling strength of a first network entity has dropped below a threshold. The method can also include transmitting a measurement report to the first network entity. The method can also include receiving radio-resource-control reconfiguration information from the first network entity. The method can also include transmitting a scheduling request to a second network entity. A Random-access-channel procedure can be avoided.

In the method of the first embodiment, the first network entity can include a master evolved-Node-B, and the second network entity can include a secondary evolved-Node-B.

In the method of the first embodiment, the receiving includes receiving a timing-advance value and mobility information.

In the method of the first embodiment, the timing-advance value corresponds to a timing-advance value of a cell of the second network entity.

According to a second embodiment, an apparatus can include at least one processor. The apparatus can also include at least one memory including computer program code. The at least one memory and the computer program code can be configured, with the at least one processor, to cause the apparatus at least to detect that a signaling strength of a first network entity has dropped below a threshold. The apparatus can also be caused to transmit a measurement report to the first network entity. The apparatus can also be caused to receive radio-resource-control reconfiguration information from the first network entity. The apparatus can also be caused to transmit a scheduling request to a second network entity. A random-access-channel procedure can be avoided.

In the apparatus of the second embodiment, the first network entity includes a master evolved-Node-B, and the second network entity includes a secondary evolved-Node-B.

In the apparatus of the second embodiment, the receiving includes receiving a timing-advance value and mobility information.

In the apparatus of the second embodiment, the timing-advance value corresponds to a timing-advance value of a cell of the second network entity.

According to a third embodiment, a method can include receiving, by a first network entity, a measurement report from a user equipment. The method can also include determining to handover a radio-resource-control connection from the first network entity to a second network entity. The method can also include performing handover preparation with the second network entity. The method can also include retrieving a timing advance value from the second network entity. The method can also include transmitting radio-resource-control reconfiguration information to a user equipment. The radio-resource-control reconfiguration information can include the timing advance value and mobility information.

In the method of the third embodiment, the first network entity includes a master evolved-Node-B, and the second network entity includes a secondary evolved-Node-B.

In the method of the third embodiment, the timing-advance value corresponds to a timing-advance value of a cell of the second network entity.

According to a fourth embodiment, an apparatus can include at least one processor. The apparatus can also include at least one memory including computer program code. The at least one memory and the computer program code can be configured, with the at least one processor, to cause the apparatus at least to receive a measurement report from a user equipment. The apparatus can also be caused to determine to handover a radio-resource-control connection from the apparatus to a network entity. The apparatus can also be caused to perform handover preparation with the network entity. The apparatus can also be caused to retrieve a timing advance value from the network entity. The apparatus can also be caused to transmit radio-resource-control reconfiguration information to a user equipment. The radio-resource-control reconfiguration information can include the timing advance value and mobility information.

In the apparatus of the fourth embodiment, the apparatus includes a master evolved-Node-B, and the network entity includes a secondary evolved-Node-B.

In the apparatus of the fourth embodiment, the timing-advance value corresponds to a timing-advance value of a cell of the network entity.

According to a fifth embodiment, a method includes performing, by a second network entity, handover preparation with a first network entity. The method also includes transmitting a timing advance value to the first network entity. The method also includes receiving a scheduling request by a user equipment. A random-access-channel procedure can be avoided.

In the method of the fifth embodiment, the first network entity includes a master evolved-Node-B, and the second network entity includes a secondary evolved-Node-B.

In the method of the fifth embodiment, the performing includes transmitting mobility information.

In the method of the fifth embodiment, the timing-advance value corresponds to a timing-advance value of a cell of the second network entity.

According to a sixth embodiment, an apparatus can include at least one processor. The apparatus can also include at least one memory including computer program code. The at least one memory and the computer program code can be configured, with the at least one processor, to cause the apparatus at least to perform handover preparation with a network entity. The apparatus can also be caused to transmit a timing advance value to the first network entity. The apparatus can also be caused to receive a scheduling request by a user equipment. A random-access-channel procedure can be avoided.

In the apparatus of the sixth embodiment, the network entity can include a master evolved-Node-B, and the apparatus can include a secondary evolved-Node-B.

In the apparatus of the sixth embodiment, the performing includes transmitting mobility information.

In the apparatus of the sixth embodiment, the timing-advance value corresponds to a timing-advance value of a cell of the apparatus.

BRIEF DESCRIPTION OF THE DRAWINGS

For proper understanding of the invention, reference should be made to the accompanying drawings, wherein.

DETAILED DESCRIPTION

Figure 1:
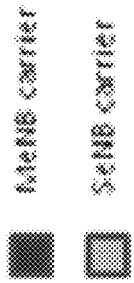
FIG. 1 illustrates a secondary evolved-Node-B (SeNB) that is deployed at the border of a coverage area of a master evolved-Node-B (MeNB) in accordance with one embodiment.
Figure 1:
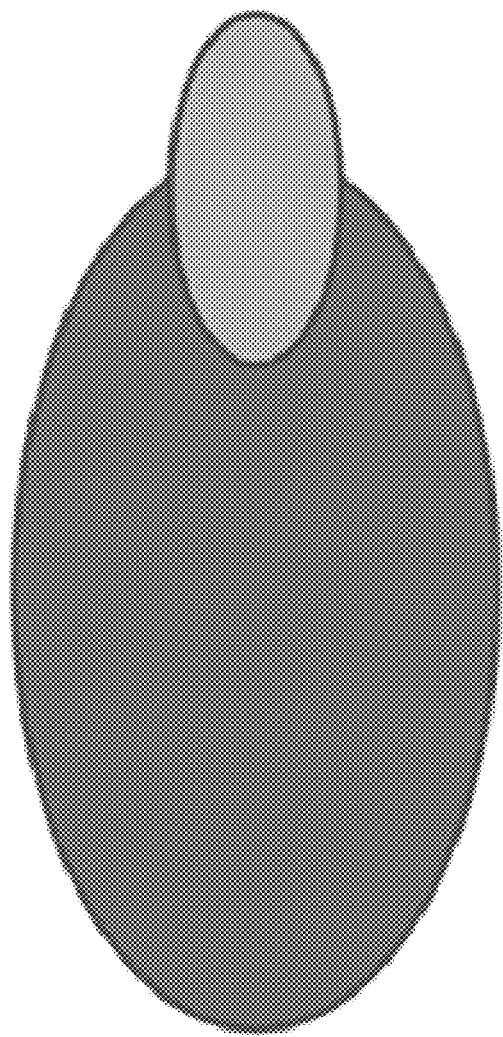

Embodiments of the present invention relate to the performing of handover and re-establishment of a Radio-Resource-Control (RRC) connection during dual-connectivity operation. Performing such handover and re-establishment is one of the focuses of 3GPP RAN2 and RAN3. In the event that a Secondary eNB (SeNB) is deployed at a border of a coverage area of a Master eNB (MeNB), if a UE moves beyond the MeNB coverage area and disconnects from the cell corresponding to the MeNB, the UE may need to reconnect to a cell corresponding to the SeNB in order to maintain connectivity. However, the UE may need to take time to re-connect to the appropriate cell.

Embodiments of the present invention provide the MeNB (and in turn the UE) with a Timing-Advance Value of the SeNB. As such, a Random Access procedure over a Random-Access Channel (RACH) that is typically performed during handover as described in more detail below may be avoided. RACH Access may be needed during handover for the UE to synchronize its uplink timing with a target node before transmissions begin. The target node can estimate the timing advance based on a received RACH preamble, a timing, and/or a channel estimation, and then the target node can provide the same as part of a Random Access Response.

In embodiments of the present invention, as the timing advance to be used in the target node is transmitted to the UE as part of the handover command itself, the UE can skip the RACH procedure. The retrieval of timing advance is possible because the target-node was already serving the UE as a secondary eNB.

Embodiments of the present invention are directed to performing handover to a new eNB without performing the typical RACH procedure. The typical RACH procedure can be avoided by transmitting a required timing advance as a part of a handover command to a target-node/evolved Node B.

In a dual-connectivity architecture, the UE can be served by two independent schedulers (such as a MeNB and a SeNB, for example), as described above. The uplink synchronization can be separately maintained for each of the independent schedulers. However, the RRC connection signaling can generally only occur via the MeNB. Embodiments of the present invention enable retrieval (by a MeNB, for example) of a timing advance value of a target-cell (such as a cell corresponding to a SeNB) as a part of a handover preparation, without performing a RACH procedure that is typically performed.

In general, in the event that a radio-link failure is detected, the UE can release all of its resources and can reselect a new cell for connection and/or can trigger a re-establishment procedure in the new cell that is typically preceded by a RACH Access. In embodiments of the present invention, the UE can skip the RACH Access and trigger re-establishment directly over PUCCH. For example, if the chosen cell is the same as that of a cell used earlier, and if the timing advance timer is determined to not be expired at that point in time, the UE would perform re-establishment without RACH Access.

Embodiments of the present invention provide extensions to existing RRC-Reconfiguration/Re-establishment procedures without substantially impacting air-interface signaling. Embodiments of the present invention allow using the timing-advance information/uplink-synchronization status of the UE at the SeNB (prior to handover or radio-link failure) to access the target cell without a RACH Access. Embodiments of the present invention can avoid performing a RACH Access during MeNB to SeNB switching. The timing advance can be provided as a part of an RRC Reconfiguration message.

Embodiments of the present invention enable the performing of a faster handover (from MeNB towards the SeNB) and a faster re-establishment procedure by retrieving a timing advance value of the target-cell as a part of handover preparation, without performing a typical RACH Access. Embodiments of the present invention can be directed to extensions to the existing RRC-Reconfiguration/Re-establishment procedures. The extensions may be included without adversely impacting air-interface signaling.

3GPP RAN2 and RAN3 are directed to Release 12 Small-Cell Enhancement. The study item was captured in Technical Report 36.842 v1.0.0 and completed at RAN #63 plenary. 3GPP RAN2 and RAN3 have begun progress on Dual Connectivity Work Item (WI) according to the outcome of Technical Report (TR) 36.842. In the study and work items, one of the main focuses is dual connectivity, which is further defined in TR 36.842.

FIG. 1 illustrates a SeNB that is deployed at the border of a coverage area of a MeNB in accordance with one embodiment. Dual Connectivity is generally considered to be an operation where a given user equipment (UE) utilizes radio resources that are provided by at least two different network points (such as a Master and Secondary eNB, for example) that are connected to each other with a non-ideal backhaul, while in RRC_CONNECTED mode.

In dual connectivity, a master eNB is generally considered to be the evolved Node B (eNB) which terminates at least S1-MME, and therefore acts as a mobility anchor towards the core network (CN). In dual connectivity, a secondary eNB can be considered to be an eNB that provides additional radio resources for the UE. The secondary eNB is generally not the Master eNB.

If a SeNB (Secondary eNB) is deployed at the border of a coverage area of a MeNB (Master eNB), there may be no coverage for a UE if the UE moves beyond the coverage area of the MeNBs, and if the UE is not able to access other MeNBs with good signal strength. If the UE moves beyond the MeNB coverage, the UE may need to be handed over to the cell that corresponds to the SeNB in order to keep the connectivity. However, re-connecting to the cells by the UE may take time, and the reconnecting may need to use limited wireless resources.

In embodiments of the present invention, an MeNB can retrieve a timing-advance value from an SeNB as a part of a handover-preparation process, and the MeNB can send the same timing-advance value to the UE as a part of a Radio-Resource Control (RRC) Reconfiguration message, as described in more detail below.

If the SeNB identifies that the UE is not in a time-synchronized state, the SeNB will generally respond without the timing advance value. In this case, the handover procedure can follow a procedure similar to the procedure used by a normal UE with RACH Access.

The UE can use the received timing-advance value of the SeNB for performing handover, and thus the UE can avoid performing a Random Access Channel (RACH) Access step that is generally performed in the handover procedure. Thus, the UE may be able to save time and resources when performing handover. In another embodiment, the MeNB can exclude retrieval of a timing-advance value and can, instead, instruct the UE to derive the timing-advance value from the UE's current UE context, which corresponds to the SeNB-cell which matches the target-cell Identification in the RRC-Reconfiguration message.

If a UE detects a Radio-link failure with an MeNB and reselects an SeNB for re-establishment, the re-establishment procedure can also be executed without RACH Access if the re-establishment with the MeNB occurs within the time-alignment timer value.

A handover procedure can be triggered from a MeNB based on a measurement report (received from the UE) indicating that the MeNB has gone below a threshold and a SeNB is above a threshold, or that the SeNB is better than the MeNB. In the handover scenario, the UE is moving to a target cell on reception of a handover command from a network.

In contrast, in the scenario when re-establishment is triggered, when the UE experiences a condition where the UE cannot continue its connection with the current cell due to one of multiple reasons, the UE itself can release the current RRC connection and can select a new cell and can re-establish the RRC connection in the new cell. In this case, the network does not know about the UE behavior until the re-establishment message is received.

In view of the above, handover can be a network-directed mobility procedure. On the other hand, re-establishment can result from a UE moving to a new cell by itself due to some specific conditions of its current source-cell, without waiting for any network command.

When a MeNB carrier goes below threshold (such as when the MeNB signalling strength goes below a threshold, for example), but an SeNB carrier has sufficient signalling strength, the UE can send a measurement report to the MeNB, and the MeNB can send RRC-Reconfiguration with mobility information indicating that the secondary cell (SCell) of the SeNB carrier should act as a target cell. The MeNB can also send reconfiguration content that maps all the relevant bearers to the SeNB. As described above, a typical RACH procedure can also be skipped because the timing advance value of the SeNB may be known to the UE.

Figure 2:
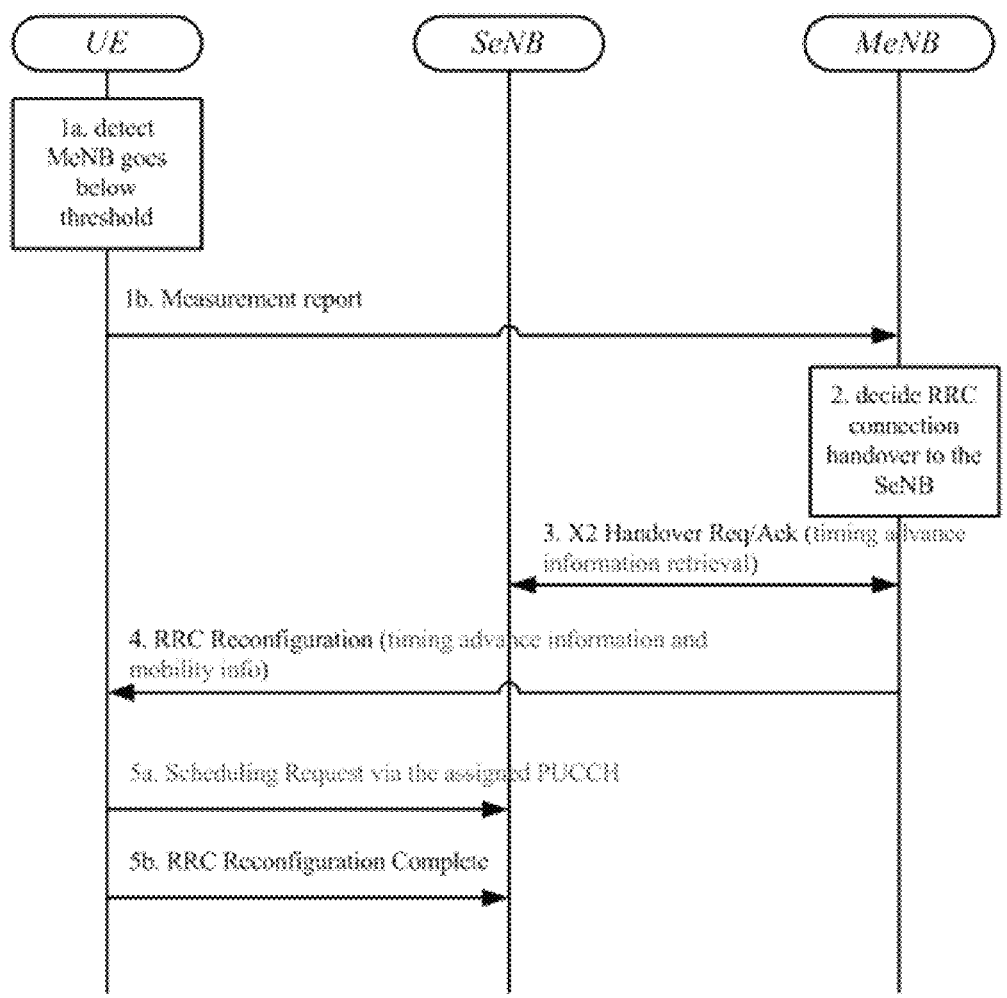
FIG. 2 illustrates a procedure for performing Radio-Resource-Control (RRC) connection handover from a Master evolved-Node-B (MeNB) to a Secondary evolved-Node-B (SeNB) in accordance with embodiments of the invention.

FIG. 2 illustrates a procedure for performing Radio-Resource-Control (RRC) connection handover from a MeNB to a SeNB in accordance with embodiments of the invention. At step 1(a), a UE detects that a MeNB has gone below a threshold. At step 1(b), the UE reports that the MeNB has gone below the threshold via a measurement report to the MeNB. At step 2, the MeNB decides to handover the RRC connection to the SeNB. At step 3, the MeNB then performs handover preparation with the SeNB, along with the retrieving of a timing advance value measured at the SeNB. At step 4, the MeNB then sends RRC-Reconfiguration information to the UE (which includes the retrieved timing-advance value and mobility information). Upon receiving the RRC-Reconfiguration information with the mobility information and the timing-advance value, the UE executes the following steps at a target cell. At step 5(a), the UE sends a Scheduling Request via an assigned physical-uplink-control-channel (PUCCH). At step 5(b), on allocated resources, the UE sends information indicating that RRC Reconfiguration has been completed.

Figure 3:
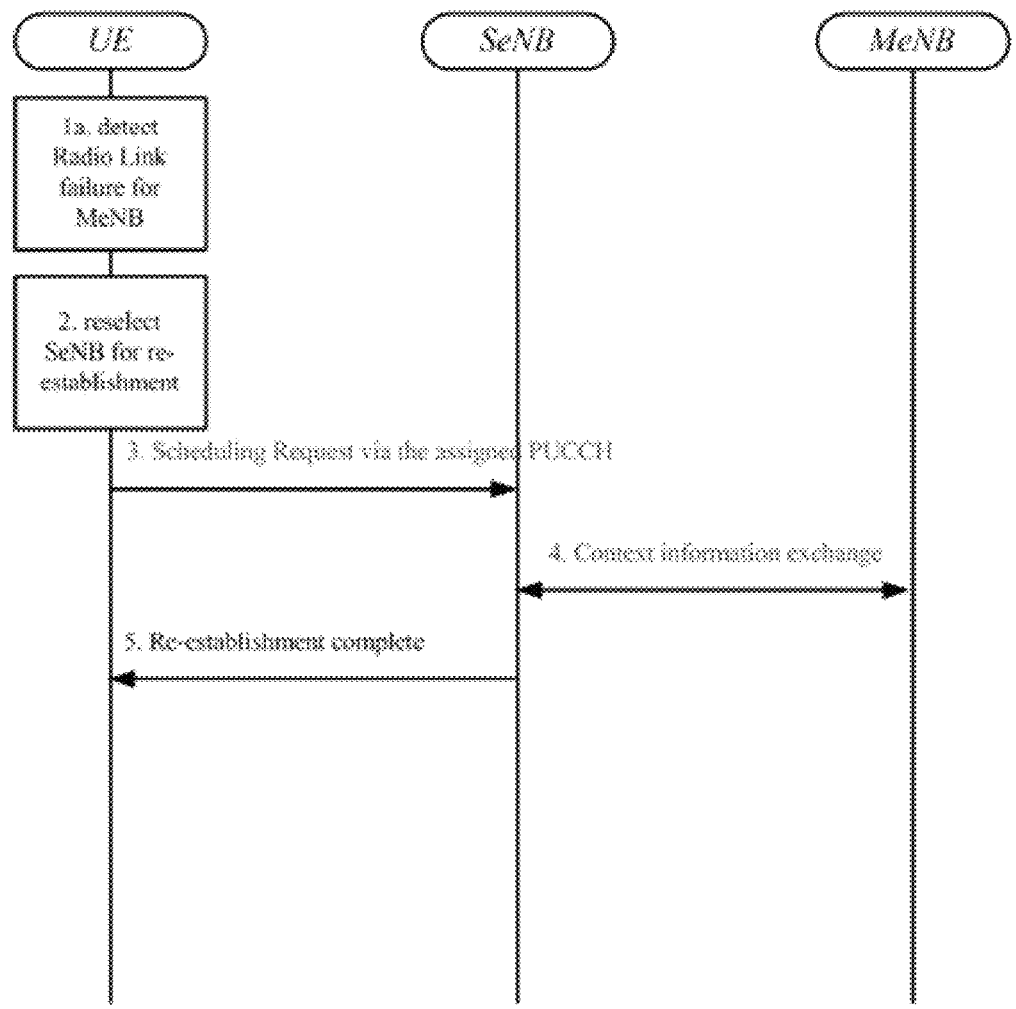
FIG. 3 illustrates a re-establishment procedure in accordance with one embodiment.

FIG. 3 illustrates a re-establishment procedure in accordance with one embodiment. At step 1(a), a user equipment (UE) detects that a radio-link failure with an MeNB has occurred. At step 2, the UE then reselects an SeNB for re-establishment. The UE then compares the new cell against the last-connected SeNB.

The UE may have been last connected to both the MeNB and the SeNB prior to re-establishment. The UE may have a connection with both the MeNB and the SeNB, and the UE may then detect radio-link failure (RLF) on the MeNB, and the MeNB may then trigger re-establishment on the SeNB. The UE, in this case, should remember its last-connected SeNB before releasing the RRC connection, and compare the last-connected SeNB with the newly selected cell.

If the new cell matches the last-connected SeNB, and the timing advance is valid, at step 3, the UE sends the Physical-Uplink-Control-Channel Scheduling Request (PUCCH-SR) on allocated resources to the SeNB, followed by performing the re-establishment procedure on the allocated resources. At step 4, the SeNB retrieves the UE context information from the MeNB, or the MeNB transfers the UE context to the SeNB. At step 5, the SeNB responds with a re-establishment message to the UE.

In case the SeNB detects a downlink radio link failure, the SeNB generally will not stop listening to the PUCCH-SR until the UE context is released. Such functionality may be needed to enable re-establishment through a PUCCH assigned to the UE at the SeNB prior to radio-link failure. The amount of resources to be allocated as a response to this PUCCH can be a same amount of uplink resources as allocated in the uplink grant content of a Random Access Response.

In view of the above, embodiments of the present invention can be related to standards. Embodiments of the present invention can impact user equipment (UE) behavior, SeNB behavior, and MeNB behavior, and also provide an X2interface under RAN3 control. For example, X2 Handover Request/Acknowledge messages should now allow the transfer of a Timing Advance Value from the SeNB to the MeNB. Embodiments of the present invention also provide an RRC interface under RAN2's control (for example, the Radio-Resource-Network-Controller (RRNC) Reconfiguration message generally includes the Timing Advance Value to be provided to the UE).

Figure 4:
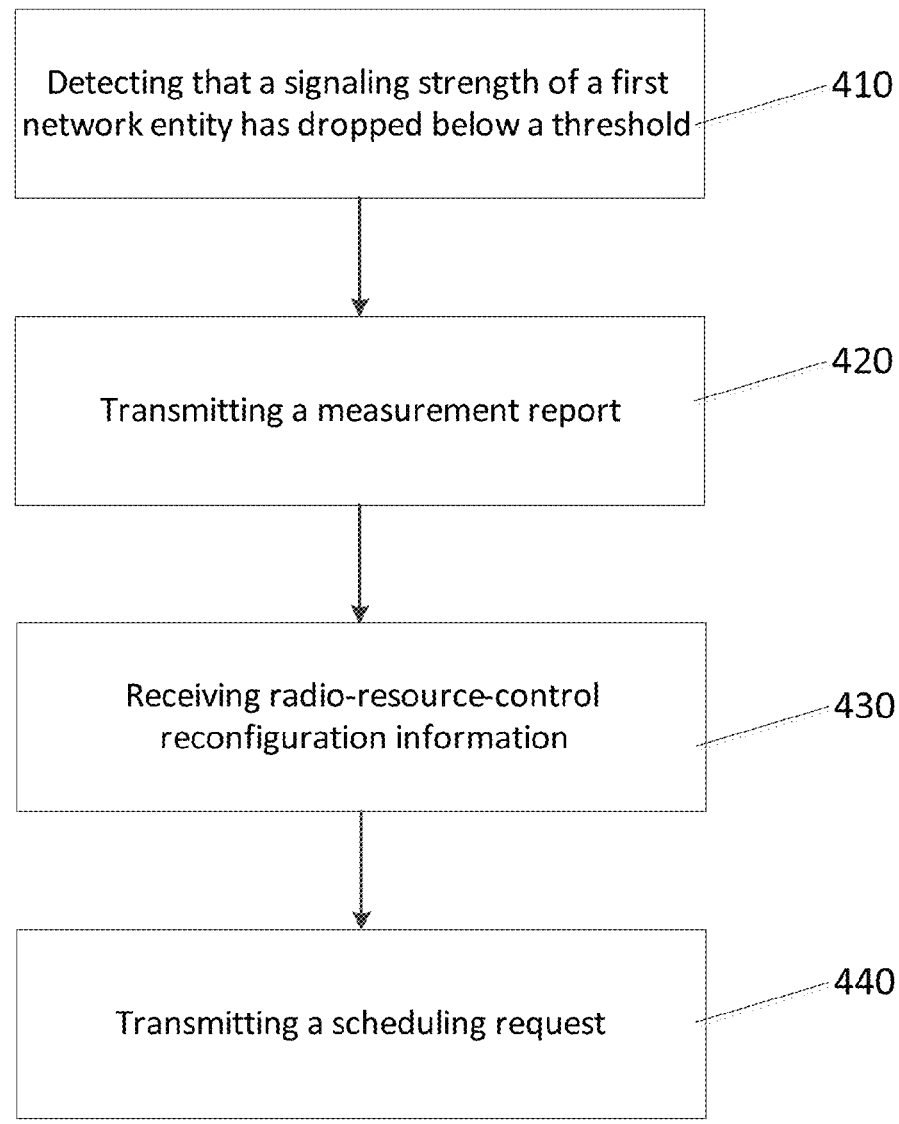
FIG. 4 illustrates a flowchart of a method in accordance with embodiments of the invention.

FIG. 4 illustrates a flowchart of a method in accordance with embodiments of the invention. The method illustrated in FIG. 4 includes, at 410, detecting, by a user equipment, that a signaling strength of a first network entity has dropped below a threshold. The method also includes, at 420, transmitting a measurement report to the first network entity. The method also includes, at 430, receiving radio-resource-control reconfiguration information from the first network entity. The method also includes, at 440, transmitting a scheduling request to a second network entity. A random-access-channel procedure can be avoided.

Figure 5:
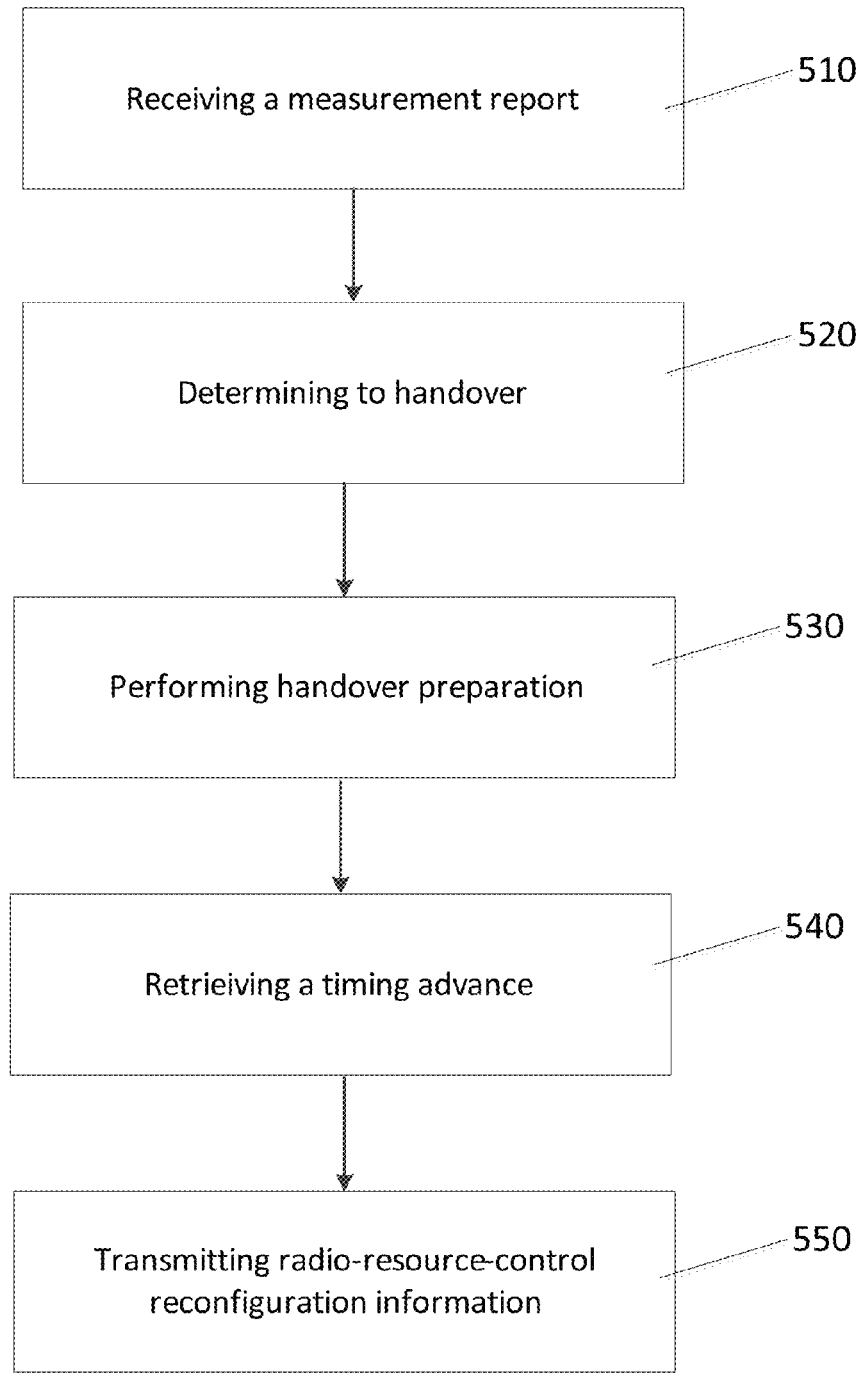
FIG. 5 illustrates a flowchart of a method in accordance with embodiments of the invention.

FIG. 5 illustrates a flowchart of a method in accordance with embodiments of the invention. The method illustrated in FIG. 5 includes, at 510, receiving, by a first network entity, a measurement report from a user equipment. The method also includes, at 520, determining to handover a radio-resource-control connection from the first network entity to a second network entity. The method also includes, at 530, performing handover preparation with the second network entity. The method also includes, at 540, retrieving a timing advance value from the second network entity. The method also includes, at 550, transmitting radio-resource-control reconfiguration information to a user equipment. The radio-resource-control reconfiguration information includes the timing advance value and mobility information.

Figure 6:
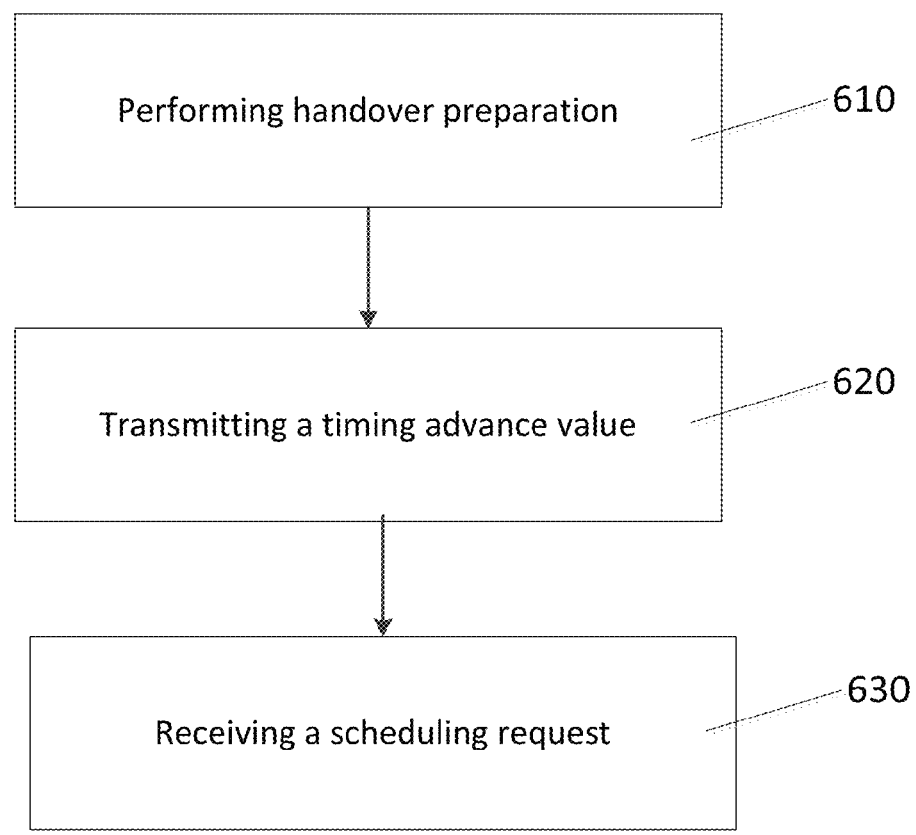
FIG. 6 illustrates a flowchart of a method in accordance with embodiments of the invention.

FIG. 6 illustrates a flowchart of a method in accordance with embodiments of the invention. The method illustrated in FIG. 6 includes, at 610, performing, by a second network entity, handover preparation with a first network entity. The method also includes, at 620, transmitting a timing advance value to the first network entity. The method also includes, at 630, receiving a scheduling request by a user equipment. A random-access-channel procedure can be avoided.

Figure 7:
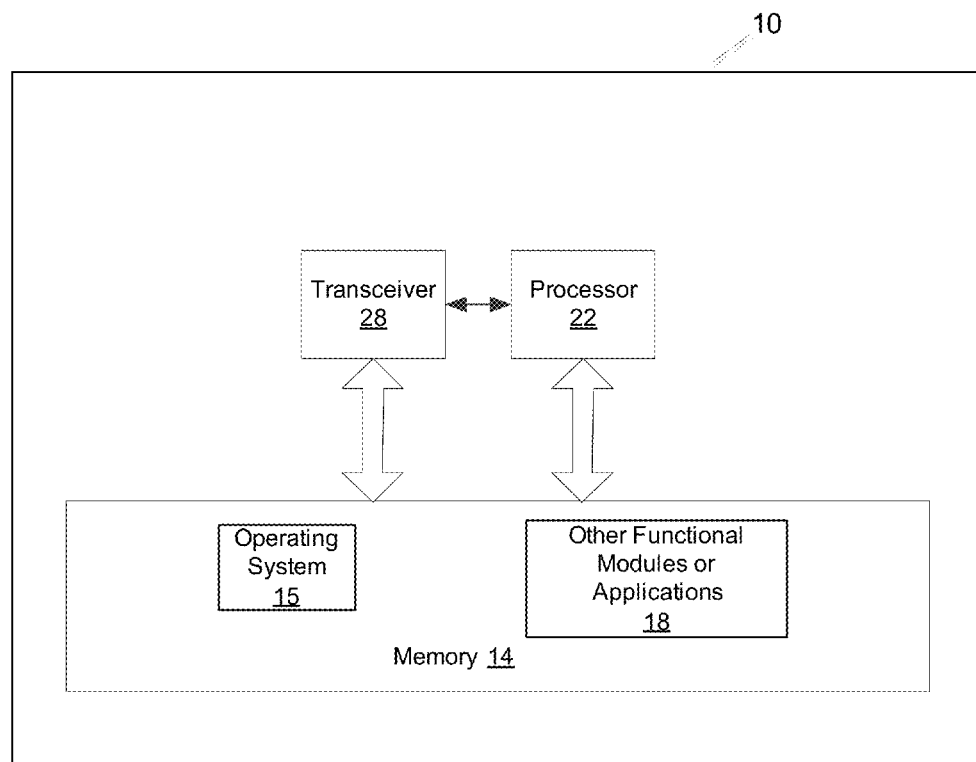
FIG. 7 illustrates an apparatus in accordance with embodiments of the invention.

FIG. 7 illustrates an apparatus in accordance with embodiments of the invention. In one embodiment, the apparatus can be a network entity such as an evolved Node B/base station. In another embodiment, the apparatus can be a user equipment. Apparatus 10 can include a processor 22 for processing information and executing instructions or operations. Processor 22 can be any type of general or specific purpose processor. While a single processor 22 is shown in FIG. 7, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. Memory 14 can include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
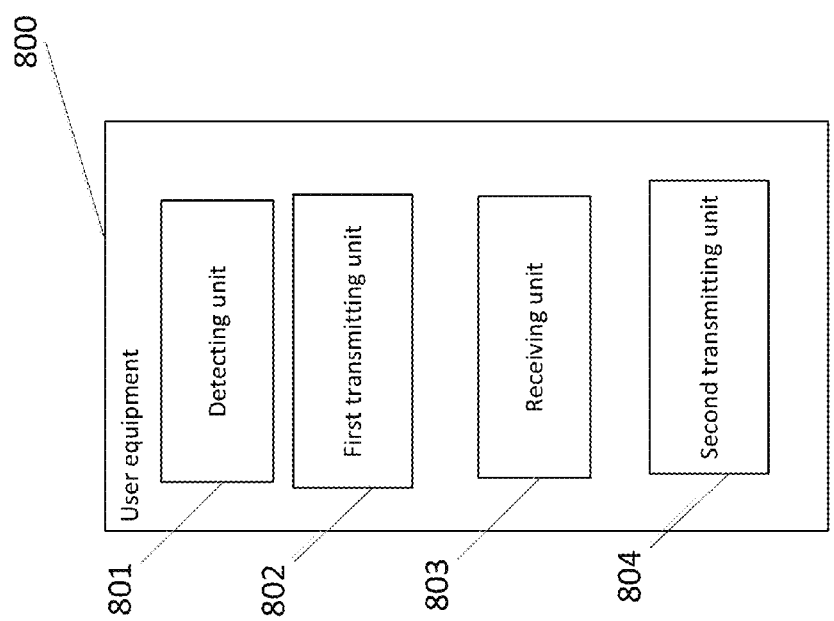
FIG. 8 illustrates an apparatus in accordance with embodiments of the invention.

FIG. 8 illustrates an apparatus in accordance with embodiments of the invention. Apparatus 800 can be a user equipment, for example. Apparatus 800 can include a detecting unit 801 that detects that a signaling strength of a first network entity has dropped below a threshold. Apparatus 800 can also include a first transmitting unit 802 that transmits a measurement report to the first network entity. Apparatus 800 can also include a receiving unit 803 that receives radio-resource-control reconfiguration information from the first network entity. Apparatus 800 can also include a second transmitting unit 804 that transmits a scheduling request to a second network entity. A random-access-channel procedure can be avoided.

Figure 9:
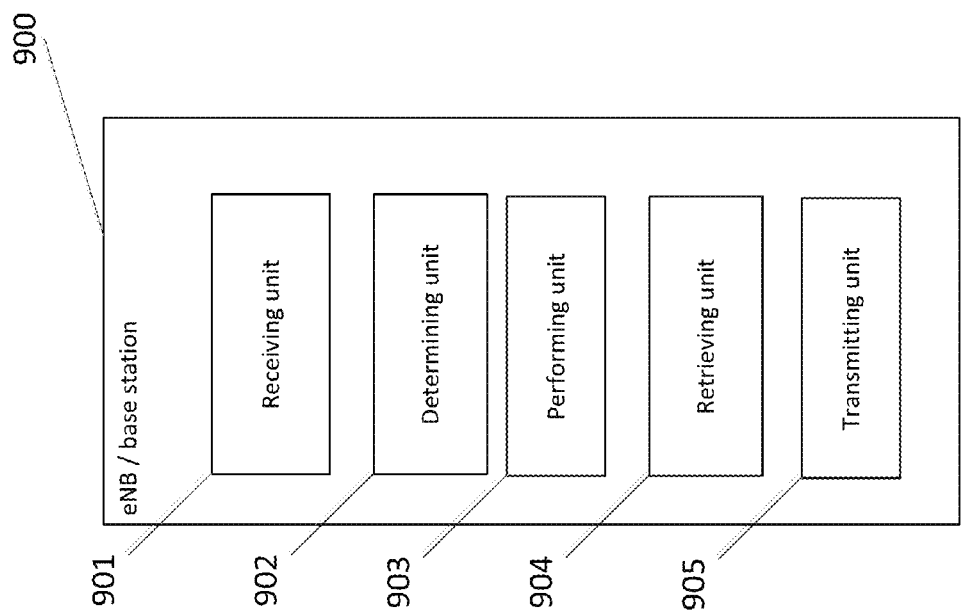
FIG. 9 illustrates an apparatus in accordance with embodiments of the invention.

FIG. 9 illustrates an apparatus in accordance with embodiments of the invention. Apparatus 900 can be a network entity such as an eNB/base station, for example. Apparatus 900 can include receiving unit 901 that receives a measurement report from a user equipment. Apparatus 900 can also include a determining unit 902 that determines to handover a radio-resource-control connection from the first network entity to a second network entity. Apparatus 900 can also include a performing unit 903 that performs handover preparation with the second network entity. Apparatus 900 can also include a retrieving unit 904 that retrieves a timing advance value from the second network entity. Apparatus 900 can also include a transmitting unit 905 that transmits radio-resource-control reconfiguration information to a user equipment. The radio-resource-control reconfiguration information includes the timing advance value and mobility information.

Figure 10:
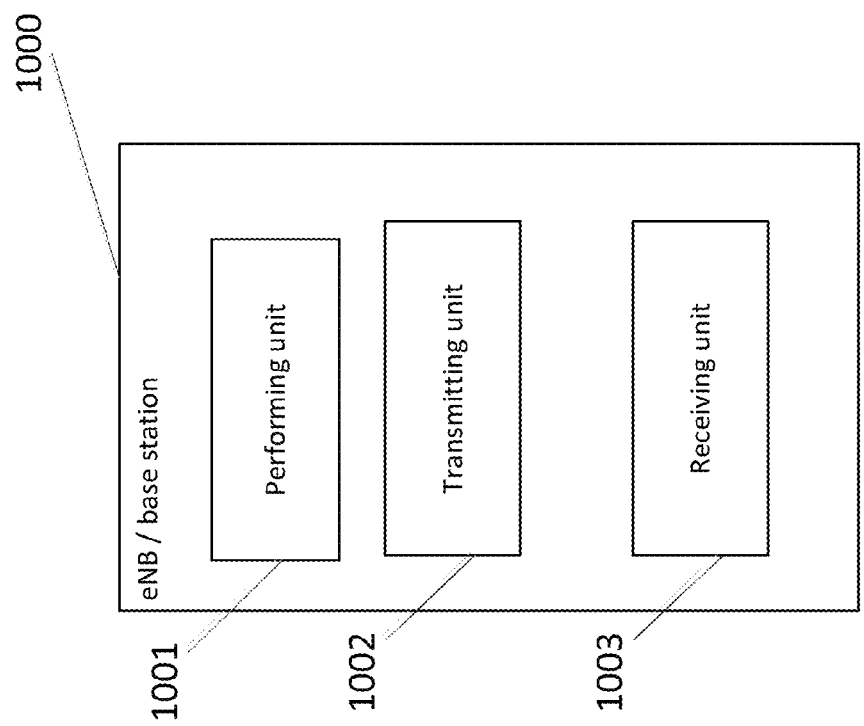
FIG. 10 illustrates an apparatus in accordance with embodiments of the invention.

FIG. 10 illustrates an apparatus in accordance with embodiments of the invention. Apparatus 1000 can be a network entity such as an eNB/base station, for example. Apparatus 1000 can include a performing unit 1001 that performs handover preparation with a first network entity. Apparatus 1000 can also include a transmitting unit 1002 that transmits a timing advance value to the first network entity. Apparatus 1000 can also include a receiving unit 1003 that receives a scheduling request by a user equipment. A random-access-channel procedure may be avoided.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
 detecting, by a user equipment having dual connectivity with a first network entity and a second network entity, that a signaling strength of the first network entity has dropped below a threshold, wherein Radio-Resource-Control (RRC) configuration information related to the first network entity and the second network entity are communicated with the user equipment via a RRC connection established between the user equipment and the first network entity;
 transmitting a measurement report to the first network entity;
 receiving from the first network entity, radio-resource-control reconfiguration information indicating a time advance value being in use by the second network entity for on-going connections between the user equipment and the second network entity; and
 using the time advance value to perform a handover of the RRC connection during the dual connectivity, from the first network entity to the second network entity network without involving a random-access-channel procedure.

2. The method according to claim 1, wherein the first network entity comprises a master evolved-Node-B, and the second network entity comprises a secondary evolved-Node-B.

3. The method according to claim 1, wherein the receiving comprises receiving mobility information.

4. The method according to claim 3, wherein the timing-advance value corresponds to a timing-advance value of a cell of the second network entity.

5. An apparatus having dual connectivity with a. first network entity and a second network entity, comprising:
 at least one processor; and
 at least one memory including computer program code,
 the at least one memory and the computer program code configured, with the at least one processor, to cause the apparatus at least to
 detect that a signaling strength of the first network entity has dropped below a threshold, wherein Radio-Resource-Control (RRC) configuration information related to the first network entity and the second network entity are communicated with the user equipment via a RRC connection established between the user equipment and the first network entity;
 transmit a measurement report to the first network entity;
 receive from the first network entity, radio-resource-control reconfiguration information indicating a time advance value being in use by the second network entity for on-going connections between the user equipment and the second network entity; and
 use the time advance value to perform a handover of the RRC connection during the dual connectivity, from the first network entity to the second network entity without involving a random-access-channel procedure.

6. The apparatus according to claim 5, wherein the first network entity comprises a master evolved-Node-B, and the second network entity comprises a secondary evolved-Node-B.

7. The apparatus according to claim 5, wherein the receiving comprises receiving mobility information.

8. The apparatus according to claim 7, wherein the timing-advance value corresponds to a timing-advance value of a cell of the second network entity.

9. A method, comprising:
 receiving, by a first network entity, a measurement report from a user equipment having dual connectivity with the first network entity and a second network entity, wherein Radio-Resource-Control (RRC) configuration information related to the first network entity and the second network entity are communicated with the user equipment via a RRC connection established between the user equipment and the first network entity;
 determining to handover a radio-resource-control connection from the first network entity to the second network entity;
 performing handover preparation with the second network entity;
 retrieving a timing advance value from the second network entity, wherein the time advance value being in use by the second network entity for on-going connections between the user equipment and the second network entity; and
 transmitting radio-resource-control reconfiguration information to the user equipment, wherein the radio-resource-control reconfiguration information comprises the timing advance value and mobility information.

10. The method according to claim 9, wherein the first network entity comprises a master evolved-Node-B, and the second network entity comprises a secondary evolved-Node-B.

11. The method according to claim 9, wherein the timing-advance value corresponds to a timing-advance value of a cell of the second network entity.

12. An apparatus, comprising:
 at least one processor; and
 at least one memory including computer program code,
 the at least one memory and the computer program code configured, with the at least one processor, to cause the apparatus at least to
 receive a measurement report from a user equipment having dual connectivity with the a apparatus and a network entity wherein Radio-Resource-.Control RRC configuration information related to the apparatus and the network entity are communicated with the user equipment via a RRC connection established between the user equipment and the apparatus;
 determine to handover the radio-resource-control connection from the apparatus to the network entity;
 perform handover preparation with the network entity;
 retrieve a timing advance value from the network entity, wherein the time advance value being in use by the network entity for on-going connections between the user equipment and the network entity; and
 transmit radio-resource-control reconfiguration information to the user equipment, wherein the radio-resource-control reconfiguration information comprises the timing advance value and mobility information.

13. The apparatus according to claim 12, wherein the apparatus comprises a master evolved-Node-B, and the network entity comprises a secondary evolved-Node-B.

14. The apparatus according to claim 12, wherein the timing-advance value corresponds to a timing-advance value of a cell of the network entity.

15. A method, comprising:
performing, by a second network entity, handover preparation with a first network entity for a user equipment having dual connectivity with the first network entity and the second network entity;
transmitting a timing advance value to the first network entity, wherein the time advance value is in use by the second network en n-going connections between the user equipment and the second network entity; and
receiving a scheduling request by the user equipment during the dual connectivity, wherein a random-access-channel procedure is avoided.

16. The method according to claim 15, wherein the first network entity comprises a master evolved-Node-B, and the second network entity comprises a secondary evolved-Node-B.

17. The method according to claim 15, wherein the performing comprises transmitting mobility information.

18. The method according to claim 15, wherein the timing-advance value corresponds to a timing-advance value of a cell of the second network entity.

19. An apparatus, comprising:
at least one processor; and
at least one memory including computer program code,
the at least one memory and the computer program code configured, with the at least one processor, to cause the apparatus at least to
perform handover preparation with a network entity for a user equipment having dual connectivity with the us and the network entity;
transmit a timing advance value to the network entity, wherein the time advance value is in use by the apparatus for on-going connections between the user equipment and the apparatus; and
receive a scheduling request by the user equipment during the dual connectivity, wherein a random-access-channel procedure is avoided.

20. The apparatus according to claim 19, wherein the network entity comprises a master evolved-Node-B, and the apparatus comprises a secondary evolved-Node-B.

21. The apparatus according to claim 19, wherein the performing comprises transmitting mobility information.

22. The apparatus according to claim 19, wherein the timing-advance value corresponds to a timing-advance value of a cell of the apparatus.

* * * * *